(12) United States Patent
Nishio et al.

(10) Patent No.: US 12,466,926 B2
(45) Date of Patent: Nov. 11, 2025

(54) POLYESTER FILM AND USE THEREOF

(71) Applicant: TOYOBO CO., LTD., Osaka (JP)

(72) Inventors: Shotaro Nishio, Tsuruga (JP); Mei Matsumura, Tsuruga (JP); Akira Shimizu, Tsuruga (JP)

(73) Assignee: TOYOBO CO., LTD., Osaka (JP)

( * ) Notice: Subject to any disclaimer, the term of this patent is extended or adjusted under 35 U.S.C. 154(b) by 371 days.

(21) Appl. No.: 17/996,249

(22) PCT Filed: Apr. 15, 2021

(86) PCT No.: PCT/JP2021/015609
§ 371 (c)(1),
(2) Date: Oct. 14, 2022

(87) PCT Pub. No.: WO2021/215349
PCT Pub. Date: Oct. 28, 2021

(65) Prior Publication Data
US 2023/0192974 A1   Jun. 22, 2023

(30) Foreign Application Priority Data

Apr. 22, 2020   (JP) .................................. 2020-075937

(51) Int. Cl.
*C08J 5/18*   (2006.01)
*C08J 7/04*   (2020.01)
(Continued)

(52) U.S. Cl.
CPC .................. *C08J 5/18* (2013.01); *G02B 1/14* (2015.01); *G06F 1/1652* (2013.01);
(Continued)

(58) Field of Classification Search
None
See application file for complete search history.

(56) References Cited

U.S. PATENT DOCUMENTS 11,934,226 B2 *   3/2024   Nishio ................. H10K 59/873
11,997,916 B2 *   5/2024   Nishio ................... B32B 27/34
(Continued)

FOREIGN PATENT DOCUMENTS

CN   107267079 A   10/2017
EP   2679378 A1   1/2014
(Continued)

OTHER PUBLICATIONS

European Patent Office, Extended European Search Report in European Patent Application No. 21792464.6 (Apr. 19, 2024).
(Continued)

*Primary Examiner* — Vivian Chen
(74) *Attorney, Agent, or Firm* — Leydig, Voit & Mayer, Ltd.

(57) ABSTRACT

In order to provide a foldable display that is suitable for mass production and that has no risk of image distortion at its folding portion after the display is repeatedly folded, the invention provides a polyester film for foldable displays in which no cracks occurs in the folding portion. In particular, the invention provides a polyester film for a foldable display, the film having a thickness of 10-125 μm and a high-temperature hold angle in a bending direction of 70° or more, wherein the high-temperature hold angle refers to an angle of a crease formed after fixing the film at a heating temperature of 85° C. for 18 hours in such a manner that a strain of 1.7% is applied to both surfaces of a bent portion of the film, and the bending direction refers to a direction that is orthogonal to a folding portion.

12 Claims, 2 Drawing Sheets

(51) Int. Cl.
    *C08J 7/043*     (2020.01)
    *C08L 67/02*     (2006.01)
    *G02B 1/14*     (2015.01)
    *G06F 1/16*     (2006.01)
    *G09F 9/30*     (2006.01)
    *H04M 1/02*     (2006.01)

(52) U.S. Cl.
    CPC .............. *C08J 7/0427* (2020.01); *C08J 7/043* (2020.01); *C08J 2367/03* (2013.01); *C08L 67/02* (2013.01); *G09F 9/301* (2013.01); *H04M 1/0214* (2013.01); *H04M 1/0268* (2013.01)

(56) References Cited

U.S. PATENT DOCUMENTS

| | | | |
|---|---|---|---|
| 12,219,801 B2 * | 2/2025 | Seo | G06F 3/0445 |
| 2014/0191220 A1 | 7/2014 | Watabe et al. | |
| 2015/0119548 A1 | 4/2015 | Takahashi et al. | |
| 2016/0322589 A1 | 11/2016 | Watabe et al. | |
| 2017/0222172 A1 | 8/2017 | Watabe et al. | |
| 2019/0315107 A1 * | 10/2019 | Ishimaru | B32B 27/18 |
| 2021/0064164 A1 | 3/2021 | Inou et al. | |
| 2021/0179794 A1 | 6/2021 | Yoshino et al. | |
| 2022/0115475 A1 | 4/2022 | Gunji et al. | |
| 2022/0275159 A1 * | 9/2022 | Yamaguchi | G02B 1/14 |
| 2022/0389269 A1 * | 12/2022 | Yamaguchi | C09D 4/06 |
| 2023/0122628 A1 * | 4/2023 | Matsumura | G02B 1/14 428/336 |
| 2023/0192974 A1 | 6/2023 | Nishio et al. | |
| 2024/0276862 A1 * | 8/2024 | Nishio | B29C 48/92 |

FOREIGN PATENT DOCUMENTS

| | | | |
|---|---|---|---|
| JP | 2003-113258 A | | 4/2003 |
| JP | 2007-138183 A | | 6/2007 |
| JP | 2010-228391 A | | 10/2010 |
| JP | 2014-065887 A | | 4/2014 |
| JP | 2014-150249 A | | 8/2014 |
| JP | 2014-156579 A | | 8/2014 |
| JP | 2016-141058 A | | 8/2016 |
| JP | 2016-155124 A | | 9/2016 |
| JP | 2018-070780 A | | 5/2018 |
| JP | 2018-072663 A | | 5/2018 |
| JP | 2018-124367 A | | 8/2018 |
| JP | 2019-127035 A | | 8/2019 |
| JP | 2020-012087 A | | 1/2020 |
| JP | 7447994 B2 | | 3/2024 |
| KR | 10-2016-0042974 A | | 4/2016 |
| WO | 2014/157109 A1 | | 10/2014 |
| WO | 2015/019203 A1 | | 2/2015 |
| WO | WO 2016-002488 A | * | 1/2016 |
| WO | 2018/110529 A1 | | 6/2018 |
| WO | 2018/150940 A1 | | 8/2018 |
| WO | 2018/159285 A1 | | 9/2018 |
| WO | 2019/082834 A1 | | 5/2019 |
| WO | 2019/131679 A1 | | 7/2019 |
| WO | 2019/202992 A1 | | 10/2019 |
| WO | 2020/066020 A1 | | 4/2020 |
| WO | WO 2021-182191 A | * | 9/2021 |

OTHER PUBLICATIONS

Japan Patent Office, International Search Report in International Patent Application No. PCT/JP2021/015609 (Jun. 22, 2021).
Korean Intellectual Property Office, Office Action in Korean Patent Application No. 10-2022-7040157 (Apr. 11, 2025).
European Patent Office, Extended European Search Report in European Patent Application No. 21766848.2 (Mar. 12, 2024).
Japan Patent Office, International Search Report in International Patent Application No. PCT/JP2021/007989 (May 25, 2021).
Japan Patent Office, Office Action in Japanese Patent Application No. 2022-505945 (Jan. 9, 2024).
Japan Patent Office, Office Action in Japanese Patent Application in 2022-505945 (Jun. 18, 2024).
Japan Patent Office, Office Action in Japanese Patent Application No. 2022- 505945 (Jan. 28, 2025).
Japan Patent Office, Decision to Grant a Patent in Japanese Patent Application No. 2024-018015 (Mar. 4, 2025).

* cited by examiner

POLYESTER FILM AND USE THEREOF

TECHNICAL FIELD

The present invention relates to polyester films for foldable displays, hard coating films for foldable displays, foldable displays, and mobile devices. The present invention further relates to foldable displays and mobile devices that are less likely to have image distortion caused by deformation of the film, even when the display is repeatedly folded, and to polyester films for such foldable displays.

BACKGROUND ART

Becoming thinner and lighter, mobile devices such as smart phones have become widely prevalent. While being required to have a variety of functions, mobile devices are also required to be convenient to use. It is taken for granted that prevailing mobile devices can be operated with one hand for simple tasks, and can be put into a clothes pocket. Thus, such mobile devices must have a small screen size, such as about 6 inches.

Tablet devices with a screen size of 7 to 10 inches are intended for use not only for video content and music, but also for business purposes, drawing, and reading, and thus have a high level of functionality. However, these devices cannot be operated with one hand and are inferior in terms of portability, leaving some issues in regards to convenience.

In order to meet the above requirements, Patent Literature (PTL) 1 suggests a technique of making a compact device by connecting multiple displays. However, due to the remaining bezel portion, the image is split, and visibility decreases. Therefore, the device disclosed in PTL 1 is not commonly used.

More recently, mobile devices equipped with a flexible or foldable display have been proposed. This technique enables conveniently carrying a mobile device equipped with a large screen display without problems of image-splitting.

Conventional displays and mobile devices that have no folding structure can be protected by a non-flexible material, such as glass, that is applied to the surface of the display. However, a foldable display that uses a single screen spanning over a folding portion must be protected by, for example, a flexible and surface-protecting hard coating film.

However, a foldable display is repeatedly folded at the point where a portion folds, and the film at that point deforms over time, causing image distortion on the display. In addition to the surface protection film, films are further used in various parts of a foldable display, such as a polarizing plate, a retardation film, a touchscreen substrate, a substrate of display cells such as organic EL, and protective materials on the back. These films are also required to be durable against repeated folding.

Accordingly, for example, Patent Literature (PTL 2) suggests a technique of partially altering the film thickness. However, the invention disclosed in PTL 2 includes a complicated production step to alter the film thickness. Therefore, this method is not suitable for mass production.

Further, Patent Literature (PTL 3) suggests a technique of adjusting the refractive index of a polyester film in the bending direction. However, there was concern that a polyethylene terephthalate-based film could not be used in applications requiring higher reliability in a high temperature range.

CITATION LIST

Patent Literature

PTL 1: JP2010-228391A
PTL 2: JP2016-155124A
PTL 3: WO2018/150940A

SUMMARY OF INVENTION

Technical Problem

The present invention aims to solve the problems that arise in conventional parts of displays as described above. The present invention aims to provide a polyester film for a foldable display, the polyester film making it possible to provide a foldable display that is suitable for mass production and that has no risk of image distortion at the folding portion of the display after being repeatedly folded and provide a mobile device equipped with such a foldable display.

Further, the present invention aims to provide a polyester film for a foldable display that does not form a crease in a folding portion of the display in a high temperature range.

Specifically, the present invention includes the following subject matter.

Item 1. A polyester film for a foldable display, the polyester film having a thickness of 10 μm or more and 125 μm or less and a high-temperature hold angle in a bending direction of 70° or more, wherein the high-temperature hold angle refers to an angle of a crease formed after fixing the polyester film at a heating temperature of 85° C. for 18 hours in such a manner that a strain of 1.7% is applied to both surfaces of the polyester film at a bent portion, and the bending direction refers to a direction that is orthogonal to a folding portion.

Item 2. The polyester film for a foldable display according to Item 1, having a density of 1.349 g/cm$^3$ or more.

Item 3. The polyester film for a foldable display according to Item 1 or 2, wherein the polyester is polyethylene naphthalate.

Item 4. The polyester film for a foldable display according to any one of Items 1 to 3, comprising an easy-to-adhere layer on at least one surface of the polyester film.

Item 5. A foldable display comprising the polyester film for a foldable display of any one of Items 1 to 4, the polyester film being disposed as a back protection film, wherein the polyester film is a single continuous polyester film placed through the folding portion of the foldable display.

Item 6. A mobile device comprising the foldable display of Item 5.

Advantageous Effects of Invention

While the foldable display produced using the polyester film for foldable displays according to the present invention maintains its suitability in mass production, the polyester film of the foldable display does not have deformation even after repeated folding of the foldable display in a high temperature range, and does not have image distortion at the folding portion of the display. A mobile device equipped with the above foldable display produced using a polyester film provides beautiful images and has a variety of functions, while being highly convenient, such as in terms of portability.

DESCRIPTION OF EMBODIMENTS

Display

The term "display" as used in the present invention refers to display devices in general. There are several types of displays, such as LCDs, organic EL displays, inorganic EL displays, LEDs, and FEDs. For example, LCDs, organic ELs, and inorganic ELs, which have a foldable structure, are preferable. Organic EL displays and inorganic EL displays, which can particularly reduce the layer structure, are particularly preferable; and organic EL displays, which have a wide color gamut, are even more preferable.

Foldable Display

A foldable display is a single continuous display that can be folded in half or other ways when carried. The size of the fordable display can be reduced by half or even more by folding it, and thus the portability thereof is improved. The foldable display preferably has a bend radius of 5 mm or less, and more preferably 3 mm or less. A bend radius of 5 mm or less enables the foldable display to be thin when folded. Therefore, a smaller bend radius is considered to be better. The present invention can suppress the formation of a crease even when the bend radius is so small.

The bend radius is preferably 0.1 mm or more, or can even be 0.5 mm or more or 1 mm or more. Even a bend radius of 0.1 mm or more can achieve a reduction in thickness sufficient for practical use in carrying the display.

Figure 1:
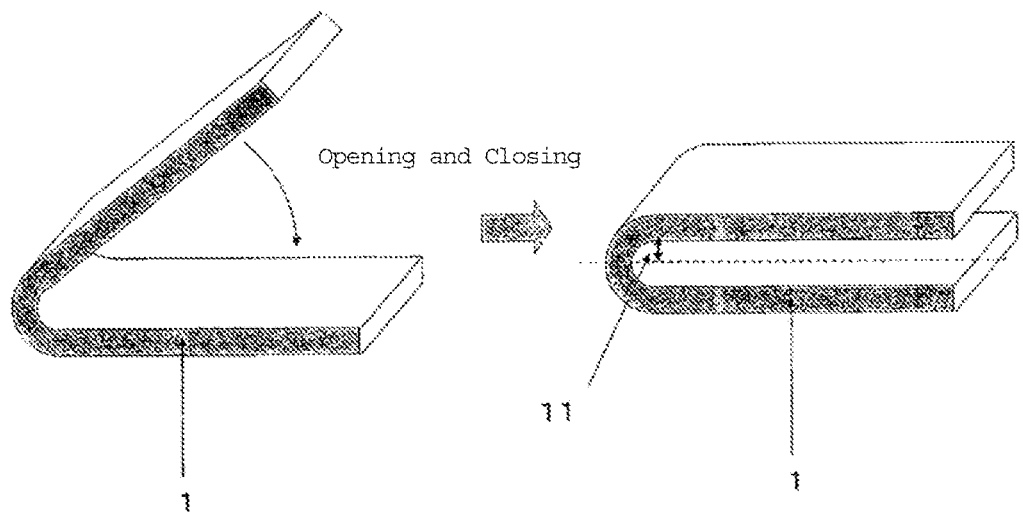
FIG. 1 is a schematic diagram showing the bend radius of the foldable display according to the present invention being folded.

The bend radius of a folded display refers to a value measured at the point indicated by numerical reference 11 in the foldable display 1 in the schematic diagram of FIG. 1, and is the inner radius of the folding portion of the display being folded. The surface protection film, described later, may be positioned on the outer side or inner side of the foldable display.

The foldable display may be a three-fold or four-fold display; or a retractable display, which is called a rollable display. All of these displays fall within the scope of the foldable display according to the present invention.

The polyester film of the present invention can be bent not only in the longitudinal direction as shown in FIG. 1, but can also be bent in the width direction.

The polyester film for a foldable display according to the present invention may be used in any part of the components of a foldable display. The following describes a typical structure of a foldable display and the parts in which the polyester film according to the present invention is usable, taking an organic EL display as an example. The polyester film for a foldable display according to the present invention may be simply referred to below as "the polyester film according to the present invention."

Foldable Organic EL Display

The essential component of a foldable organic EL display is an organic EL module. A foldable organic EL display may further optionally include, for example, a circularly polarizing plate, a touchscreen module, a surface protection film, and a back protection film.

Organic EL Module

A typical structure of an organic EL module includes an electrode, an electron transport layer, a light-emitting layer, a hole transport layer, and a transparent electrode. The polyester film according to the present invention can be used as a substrate on which an electrode is provided, and further an electron transport layer, a light-emitting layer, and a hole transport layer are provided. In particular, the polyester film according to the present invention can be preferably used as a substrate for a transparent electrode. In this case, because the substrate film is required to have a high level of barrier properties against water vapor or oxygen, the polyester film according to the present invention is preferably provided with a barrier layer such as a metal oxide layer. To enhance the barrier properties, multiple barrier layers may be provided, or multiple polyester films provided with a barrier layer may be used.

Touch Panel Module

The mobile device preferably includes a touchscreen. An organic EL display for use preferably includes a touchscreen module on the organic EL display or between the organic EL module and the circularly polarizing plate. The touchscreen module includes a transparent substrate such as a film and a transparent electrode provided on the transparent substrate. The polyester film according to the present invention can be used as this transparent substrate. The polyester film used as a transparent substrate of a touchscreen is preferably provided with a hard coating layer or a refractive index adjustment layer.

Circularly Polarizing Plate

The circularly polarizing plate suppresses the deterioration of image quality due to the reflection of external light by the components inside the display. A circularly polarizing plate includes a linear polarization plate and a retardation film. The linear polarization plate includes a protection film at least on the viewing side of the polarizer. A protection film may be provided on the side opposite the viewing side of the polarizer, and a retardation film may be directly stacked on the polarizer. The retardation film for use is a resin film with a phase difference such as polycarbonate or cyclic-olefin, or a resin film provided with a retardation layer composed of a liquid crystal compound. The polyester film according to the present invention can be used as a polarizer protection film or a resin film for a retardation film. In these cases, the slow axis direction of the polyester film according to the present invention is preferably parallel or orthogonal to the absorption axis direction of the polarizer. A deviation of up to 10 degrees, preferably 5 degrees, from this parallel or orthogonal relationship is permissible.

Surface Protection Film

Because a shock applied to a display from above may break the circuitry of an organic EL module or a touchscreen module, a surface protection film is provided in most cases. The polyester film according to the present invention can be used as the surface protection film. The surface protection film includes a "cover window," which is incorporated into the top surface of the display; and an "after film," which can be attached, peeled off, and replaced with another by the user. The polyester film according to the present invention is usable in either case. The polyester film according to the present invention used as a surface protection film preferably has a hard coating layer stacked on at least the front surface of the polyester film. The polyester film is provided on the front surface of a foldable display with the hard coating layer on the viewing side. The hard coating layer may be provided on both surfaces of the polyester film.

Back Protection Film

A protection film is also preferably provided on the back side of the display. Specifically, the display is configured such that an adhesive layer is provided on the non-viewing side of an organic EL module and the adhesive layer and a protection film are bonded together. The polyester film according to the present invention can be used as the protection film on the back side.

The polyester film according to the present invention, which is usable at the folded portion in components of a foldable display, can also be used for purposes other than those described above.

Among these, the polyester film according to the present invention is preferably used in cover window surface protection films, after-surface protection films, substrate films for touchscreen modules, or back protection films. The polyester film according to the present invention is more preferably used in cover window surface protection films, or after-surface protection films.

In a foldable display, the polyester film according to the present invention does not have to be used in all of the films described above. In a foldable display, films such as a polyimide film, a polyamide film, a polyamide-imide film, a polyester film that is not the polyester film according to the present invention, a polycarbonate film, an acrylic film, a triacetyl cellulose film, a cyclo-olefin polymer film, a polyphenylene sulfide film, and a polymethylpentene film are also usable according to suitability, in addition to the polyester film according to the present invention.

The polyester film according to the present invention may be a monolayered film composed of one or more types of polyester resins. If two or more types of polyester are used, the polyester film may be a multilayered film or ultra-multilayered lamination film with a repeating structure.

Examples of polyester resins for use in the polyester film include polyethylene terephthalate, polybutylene terephthalate, polyethylene naphthalate such as polyethylene-2,6-naphthalate, and polyester films composed of copolymers that contain the component of these resins as the main component. In particular, from the standpoint of mechanical properties, heat resistance, and transparency, polyethylene naphthalate films, in particular, drawn polyethylene naphthalate films, are particularly preferable.

In an embodiment in which the polyester film comprises polyethylene naphthalate resin as a main component and further contains one or more other polyesters, the content of such other polyester films may be 40 wt. % or less, for example, 10 wt. % or less, and may be 5 wt. % or less, and preferably 5 mass % or less, per 100 wt. % of the resins of the polyester film.

On the other hand, the polyethylene naphthalate resin content may be 60 wt. % or more, 90 wt. % or more, or 95 wt. % or more, and is preferably, for example, 95 wt. % or more.

Less than 5 wt. % of the other polyester resins allows the polyester film to maintain high crystallinity and a good high-temperature hold angle.

In one embodiment, the percentage of polyethylene naphthalate in the starting material ratio of the polyester film is 100% by weight.

In the present invention, the polyester film may comprise multiple types of polyethylene naphthalates that have different properties.

When the percentage of polyethylene naphthalate is increased, the polyester film does not deform even when the polyester film has been repeatedly folded in a high temperature range, and image distortion at the folding portion of the display can be suppressed. Further, a mobile device equipped with the above foldable display produced using the polyester film according to the present invention provides beautiful images and has a variety of functions, while being highly convenient, such as in terms of portability.

When a polyester copolymer is used in a polyester film, the dicarboxylic acid component of the polyester can be, for example, aliphatic dicarboxylic acids, such as adipic acid and sebacic acid; aromatic dicarboxylic acids, such as terephthalic acid, isophthalic acid, phthalic acid, and 2,6-naphthalene dicarboxylic acid; or multifunctional carboxylic acids, such as trimellitic acid and pyromellitic acid. The glycol component can be, for example, fatty acid glycols, such as ethylene glycol, diethylene glycol, 1,4-butanediol, propylene glycol, and neopentyl glycol; aromatic glycols, such as p-xylene glycol; alicyclic glycols, such as 1,4-cyclohexanedimethanol; or polyethylene glycols with an average molecular weight of 150 to 20,000. The mass ratio of the copolymer component of the copolymer is preferably less than 3 mass %. A mass ratio of less than 3 mass % is preferable because film strength, transparency, and heat resistance are retained.

In the production of a polyester film, at least one type of resin pellet preferably has an intrinsic viscosity of 0.40 to 1.0 dl/g. An intrinsic viscosity of 0.40 dl/g or more is preferable because such an intrinsic viscosity increases the shock resistance of the obtained film, and thus makes it unlikely for the internal circuitry of the display to be broken by an external shock. An intrinsic viscosity of 1.00 dl/g or less is preferable because it prevents filtration pressure of the molten fluid from becoming too high, thus making it easier to stably perform film production.

For example, the extreme viscosity of at least one type of resin pellet is 0.40 to 0.8 dl/g, and the extreme viscosity may be 0.40 to 0.7 dl/g.

The polyester film preferably has a thickness of 10 μm or more to 125 μm or less, and, for example, 25 μm or more and 100 μm or less. A thickness of 10 μm or more provides a pencil hardness improvement effect and an impact resistance improvement effect, and a thickness of 125 μm or less is advantageous in weight reduction and provides excellent flexibility, processability, and handleability.

The surface of the polyester film according to the present invention may be smooth or uneven. When the polyester film is used for covering the surface of a display, the film preferably has a smooth surface.

The haze is preferably 3% or less, more preferably 2% or less, and particularly preferably 1% or less. A haze of 3% or less can improve the visibility of images. Although a lower haze is better, the lower limit of haze may be preferably 0.1% or more, or 0.3% or more, from the standpoint of stable production.

Given the purposes of reducing haze as described above, the surface should not be too uneven. However, to provide the film with moderate slipperiness for handleability, the film may have unevenness on the surface.

The surface can be made uneven by a method of incorporating particles into the polyester resin layer of the surface layer, or by a method of forming a particle-containing coating layer by application to the polyester resin layer during the film-forming process.

The method for adding particles to a polyester resin layer can be a known method. For example, particles can be added at any stage of polyester production and can be preferably added in the form of slurry prepared by dispersing the particles in, for example, ethylene glycol, in the esterification stage, after the completion of transesterification, or before the start of polycondensation to facilitate polycondensation. Alternatively, particles can be added by a method of blending slurry prepared by dispersing particles in ethylene glycol or water with a polyester material by using a kneading extruder equipped with a vent, or a method of blending dry particles with a polyester material by using a kneading extruder.

In particular, preferable is a method of homogeneously dispersing the aggregates of inorganic particles in a monomer solution, which is part of a polyester material; then filtering the dispersion; and adding the filtrate to the remainder of the polyester material before, during, or after esterification. Due to the low viscosity of the monomer solution, this method enables homogeneous dispersion of particles and high-precision filtration of the slurry in a simple manner while ensuring excellent particle dispersibility and low likelihood of the occurrence of new aggregates when particles are added to the remainder of the polyester material. From this viewpoint, it is particularly preferable to add particles to the remainder of the polyester material at a low temperature before esterification.

Additionally, the number of protrusions on the surface of the film can be further reduced by a method of preparing a particle-containing polyester beforehand, and kneading the particle-containing polyester pellets with particle-free pellets to extrude pellets (master batch method).

The polyester film may contain various additives within the range in which the desired total light transmission is maintained. Examples of additives include an antistatic agent, a UV absorber, and a stabilizer.

The polyester film has a total light transmittance of preferably 85% or more, and more preferably 87% or more. A transmittance of 85% or more sufficiently ensures visibility. Although a higher total light transmittance of the polyester film is better, the total light transmittance is preferably 99% or less, or may be 97% or less, from the standpoint of stable production.

The maximum heat shrinkage of the polyester film after heat treatment at 150° C. for 30 minutes is preferably 2% or less, more preferably 1.5% or less, and for example, 1.2% or less.

When the heat shrinkage is 2% or less, dimensional changes due to heat generated by the organic EL display itself can be suppressed. Although a lower heat shrinkage is considered to be better, the heat shrinkage is preferably −1% or more, and more preferably 0% or more. A negative value means that the polyester film expanded after heating. A value below −1% may lead to poor flatness.

The surface of the polyester film according to the present invention can be subjected to treatment for improving adhesion to a resin for forming, for example, a hard coating layer.

Examples of surface treatment methods include unevenness-forming treatment by sandblasting, solvent treatment, etc.; and oxidation treatment such as corona discharge, electron beam irradiation, plasma treatment, ozone-UV irradiation, flame treatment, chromic-acid treatment, and hot-air treatment. These methods can be used without any restriction.

Adhesion can also be improved by an adhesion-improving layer, such as an easy-to-adhere layer. For the easy-to-adhere layer, resins such as acrylic resins, polyester resins, polyurethane resins, and polyether resins can be used without any restriction. The easy-to-adhere layer can be formed by a typical coating technique, preferably an "in-line coating technique."

The polyester film described above can be produced, for example, by performing a polymerization step of homogenously dispersing inorganic particles in a monomer solution, which is part of a polyester material, filtering the dispersion, and then adding the filtrate to the remainder of the polyester material to polymerize a polyester; and a film-forming step of melting and extruding the polyester into a sheet form through a filter, and cooling and drawing the sheet to form a substrate film.

Below, the method for producing a biaxially oriented polyester film is described with an example in which pellets of polyethylene terephthalate ("PET" below) are used as a material of a substrate film. However, the method is not limited to this example. Additionally, the example is not intended to limit the number of layers, such as a monolayer or a multilayer.

In an embodiment in which a polyethylene naphthalate (PEN) film is used in place of the PET film, the polyester film according to the present invention can also be produced in the same manner.

After a predetermined proportion of PET pellets is mixed and dried, the mixture is fed into a known extruder for melting and laminating, and then extruded from the slit die into a sheet form, followed by cooling and solidifying the sheet on a casting roll to form an unstretched film. A monolayer can be produced with a single extruder. A multilayered film (i.e., including two or more layers) can be produced by laminating multiple film layers that each constitute an outermost layer using two or more extruders, a multilayered manifold, or a confluence block (e.g., confluence blocks with a square joint), extruding a sheet of two or more layers from the outlet, and cooling the sheet on a casting roll to prepare an unstretched film.

In this case, it is preferable to perform high-precision filtration to remove foreign matter that may be present in the resin at any portion of the extruder at which the molten resin is maintained at about 300° C. during melt-extrusion. The filter material for use in high-precision filtration of a molten resin can be any material; however, a filter material made of sintered stainless steel is preferable because it is excellent in removing aggregates composed mainly of Si, Ti, Sb, Ge, or Cu and organic matter with a high melting point.

Additionally, the filter material has a filtered particle size (initial filtration efficiency: 95%) of preferably 20 μm or less, particularly preferably 15 μm or less. A filtered particle size (initial filtration efficiency: 95%) exceeding 20 μm may lead to insufficient removal of foreign matter with a size of 20 μm or more. Although high-precision filtration of molten resin using a filter material with a filtered particle size of 20 μm or less (initial filtration efficiency: 95%) may reduce productivity, such a filter material is preferable from the standpoint of obtaining a film that has fewer protrusions caused by coarse particles.

Refractive Index in Bending Direction

In the present invention, the refractive index of the polyester film at least either in the longitudinal direction (machine direction) or in the width direction is preferably 1.610 or more and 1.750 or less, for example, 1.610 or more and 1.710 or less, and more preferably 1.630 or more and 1.680 or less.

In one embodiment, the refractive index of the polyester film in the longitudinal direction is 1.610 or more, which can efficiently increase the crystallinity and improve the high-temperature hold angle. A refractive index of 1.750 or less can reduce stress during bending and improve both the hold angle at room temperature and the high-temperature hold angle.

In another embodiment in which the refractive index of the polyester film in the width direction is within the above range, the refractive index of the polyester film in the longitudinal direction is preferably higher than the refractive index of the polyester film in the width direction.

The refractive index of the polyester film in the bending direction is preferably 1.610 or more and 1.750 or less, for example, 1.610 or more and 1.710 or less, and more preferably 1.630 or more and 1.680 or less.

Figure 2:
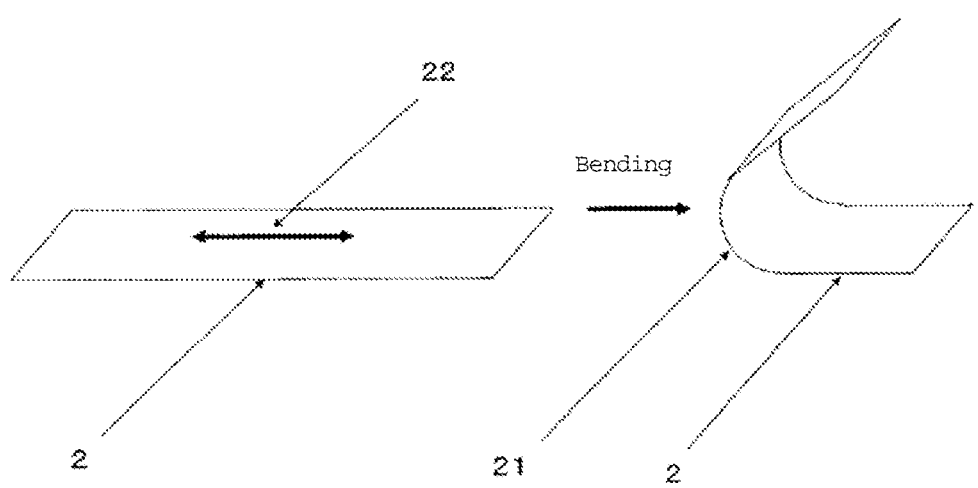
FIG. 2 is a schematic diagram showing the bending direction of the polyester film for a foldable display according to the present invention.

The "bending direction" as referred to herein indicates a direction orthogonal to a folding portion (reference numeral 21) where a foldable display formed using the polyester film is assumed to be folded, as indicated by reference numeral 22 on the polyester film (reference numeral 2) shown in FIG. 2.

When the polyester film has a refractive index of 1.610 or more and 1.750 or less at least either in the longitudinal direction or in the width direction, the polyester film has less deformation when repeatedly folded; and foldable displays formed of the polyester film have no risk of image quality deterioration, and are therefore preferable.

The refractive index of the polyester film in the bending direction is more preferably 1.630 to 1.680. Of course, the direction is preferably the bending direction described above. A refractive index of 1.610 or more can efficiently increase the crystallinity and improve the high-temperature hold angle. A refractive index of 1.750 or less can reduce the stress when the polyester film is bent, and the hold angle at room temperature and the high-temperature hold angle can both be improved.

The refractive index of the polyester film can be effectively adjusted by adjusting the draw ratio and the draw temperature. In order to adjust the refractive index, relaxing in the drawing direction or multi-stage drawing can be performed. In performing multi-stage drawing, it is preferable to set the draw ratio in the second and subsequent stages to a higher ratio than the draw ratio in the first stage.

Fatigue due to compressive stress applied to the inside of the polyester film when the display is folded can be reduced by controlling the refractive index of the polyester film at least either in the longitudinal direction (machine direction) or in the width direction, preferably the refractive index of the polyester film in the bending direction, so as to fall within the ranges above. Fatigue due to compressive stress is considered to occur mainly in the crystalline portions; fewer crystals in the bending direction causes less fatigue. Therefore, it is thought that when the refractive index in the bending direction is lower than that in the direction perpendicular to the bending direction, a lesser amount of crystals is oriented in the bending direction and compressive fatigue is reduced.

Additionally, the creep phenomenon caused by tensile stress applied to the outer side of the folded display can be reduced by decreasing the refractive index. Fatigue due to tensile stress is thought to occur mainly in the amorphous portions; repeatedly applied stress causes the molecular chains to align, thus deforming the film. It is inferred that having fewer molecular chains aligned in the bending direction leads to less deformation caused by such an alignment of molecular chains. Because fatigue due to tension can be reduced by decreasing amorphous portions, higher crystallinity, that is, higher density, is preferable.

In the present invention, the draw ratio of an unstretched polyester sheet at least either in the longitudinal direction (machine direction) or in the width direction is preferably 1.0-fold or more and 3.4-fold or less, and more preferably 1.4-fold or more and 2.3-fold or less. The draw direction is preferably the bending direction. A draw ratio of 3.4-fold or less is preferable because the film thickness does not become uneven. The draw temperature is preferably 120° C. or more and 150° C. or less, and more preferably 125° C. or more and 145° C. or less. The heating method for use during drawing can be a known technique, such as a hot-air heating method, a roll heating method, or an infrared heating method. A draw temperature of 125° C. or more and 145° C. or less can prevent the film from having great unevenness in the thickness caused by drawing at a draw ratio within the range described above.

Refractive Index in the Direction of the Folding Portion

The refractive index of the polyester film in the direction orthogonal to the direction in which the refractive index is 1.610 or more and 1.750 or less is preferably 1.750 to 1.870. Specifically, the refractive index in the direction orthogonal to the bending direction (the direction of the folding portion) is preferably 1.750 or more and 1.870 or less. A refractive index of 1.750 or more and 1.870 or less can reduce deformation that occurs when the polyester film is folded in the bending direction. A refractive index of 1.870 or less can suppress the formation of cracks or fracture in the direction of the folding portion. Further, a refractive index of 1.870 or less can suppress fracture in the winding step after drawing. A refractive index of 1.750 or more can increase the density and improve the high-temperature hold angle.

For example, when the longitudinal direction of the polyester film is the bending direction, the direction orthogonal to the bending direction (i.e., the direction of the folding portion) corresponds to the direction in which the width direction of the polyester film is orthogonal to the bending direction (i.e., the direction of the folding portion).

The refractive index in the direction orthogonal to the bending direction is preferably 1.770 to 1.830.

When the refractive index in the bending direction is compared to the refractive index in the direction orthogonal to the bending direction (i.e., the direction of the folding portion), the refractive index in the bending direction is preferably lower than that in the direction orthogonal to the bending direction.

According to this embodiment, the polyester film deforms less when folded in the bending direction. Further, the refractive index can suppress the formation of cracks in the direction of the folding portion, and also suppress fracture. Further, fracture in the winding step after drawing can be suppressed. In addition, this embodiment can increase the density and improve the high-temperature hold angle.

The refractive index in the direction orthogonal to the bending direction can be adjusted by, for example, the draw ratio, drawing preheating temperature, draw temperature, multi-stage drawing, and film relaxation. The draw ratio is preferably 3.3 to 5.0-fold, more preferably 3.5 to 4.5-fold. The drawing preheating temperature in the direction orthogonal to the bending direction is preferably 125 to 145° C. In performing multi-stage drawing in the direction orthogonal to the bending direction, it is preferable to set the draw ratio in the second and subsequent states higher than the draw ratio in the first stage. Film relaxation may be performed by 0 to 10% in either the machine direction (longitudinal direction) or in the vertical direction (width direction), or both.

Refractive Index in the Thickness Direction

The refractive index in the thickness direction is preferably 1.520 or less, more preferably 1.515 or less, still more preferably 1.510 or less, particularly preferably 1.505 or less, and most preferably 1.500 or less. A lower refractive index in the thickness direction is preferable; however, from the standpoint of stable production, the refractive index in the thickness direction is preferably 1.3 or more, and may be even 1.4 or more. The refractive index in the thickness direction is particularly preferably 1.410 or more.

Density of Polyester Film

The density of the polyester film is preferably 1.349 g/cm$^3$ or more, and more preferably 1.350 g/cm$^3$ or more. A density of 1.350 g/cm$^3$ or more can increase the high-temperature hold angle. A higher density is better. Although it depends somewhat on, for example, whether particles are present in the polyester film, the density of the polyester film is preferably 1.40 g/cm$^3$ or less, and more preferably 1.395 g/cm$^3$ or less.

A density of the polyester film of 1.349 g/cm$^3$ or higher can lead to sufficient crystallization of the polyester film and can suppress deformation at 85° C. Further, such a density can suppress high heat shrinkage and suppress dimensional changes due to heat generation of the device.

Setting the heat fixation temperature during film formation to 210 to 270° C. facilitates crystallization and thus effectively increases the density within the range described above.

The bending direction of the polyester film is preferably the longitudinal direction (machine direction). This makes it easier to decrease the refractive index in the bending direction in the second drawing in biaxial drawing, and increase flexibility. More specifically, a preferable polyester film can be obtained by drawing an unstretched polyester sheet in the longitudinal direction in a draw ratio of 1.0 to 2.3-fold, and more preferably 1.4 to 2.1-fold. Additionally, in a preferable embodiment, the polyester film is drawn in the width direction in a draw ratio of 3.3 to 5.0-fold, and more preferably 3.5 to 4.5-fold.

The polyester film of the present invention has a high-temperature hold angle in the bending direction of 70° or more. In the present specification, the high-temperature hold angle refers to an angle of a crease formed after fixing the polyester film at a heating temperature of 85° C. for 18 hours in such a manner that a strain of 1.7% is applied to both surfaces of the polyester film at a bent portion. The bending direction refers to a direction that is orthogonal to a folding portion of a foldable display produced using the polyester film.

The high-temperature hold angle in the bending direction is 71° or higher, for example, 72° or higher. A higher angle is preferable, and 180° is most preferred. However, the high-temperature hold angle in the bending direction may be less than 180°. For example, even a high-temperature hold angle of 170° or less also provides sufficient function.

When the high-temperature hold angle in the bending direction is within the range described above, deformation at 85° C. can be suppressed. In addition, an increase in heat shrinkage can be suppressed and dimensional changes due to heat generation of the device can be suppressed. Therefore, according to the present invention, deformation does not occur even after repeated folding in a high temperature range, and can suppress image distortion in the folded portion of the display. A mobile device equipped with the above foldable display produced using the polyester film provides beautiful images and has a variety of functions, while being highly convenient, such as in terms of portability.

The method for measuring the high-temperature hold angle in the bending direction will be illustrated in the Examples.

Easy-to-Adhere Layer

In the present invention, it is also preferable to laminate an easy-to-adhere layer on at least one surface of the polyester film according to the present invention in order to improve the adhesiveness between the polyester film and the hard coating layer or other layers. The easy-to-adhere layer can be obtained by applying a coating solution for forming an easy-to-adhere layer to one or both surfaces of an unstretched or longitudinal, uniaxially oriented film, optionally performing heat treatment to dry the applied coating, and drawing the film in at least one direction in which the film is not stretched. Heat treatment can also be performed after biaxial drawing is performed. It is preferable to control the final amount of the applied easy-to-adhere layer to 0.005 to 0.20 g/m$^2$. An amount of the applied easy-to-adhere layer of 0.005 g/m$^2$ or more is preferable because it provides adhesiveness. An amount of the applied easy-to-adhere layer of 0.20 g/m$^2$ or less is preferable because it provides blocking resistance.

Examples of resins to be contained in the coating solution for use in laminating an easy-to-adhere layer include polyester-based resins, polyether-polyurethane-based resins, polyester polyurethane resins, polycarbonate polyurethane resins, and acrylic resin; these resins can be used without any particular limitation. Examples of crosslinking agents to be contained in the coating solution for forming an easy-to-adhere-layer include melamine compounds, isocyanate compounds, oxazoline compounds, epoxy compounds, and carbodiimide compounds. These crosslinking agents can also be used in a combination of two or more. Due to the nature of in-line coating, these are preferably applied in the form of an aqueous coating solution, and the resins and the crosslinking agents are preferably water-soluble or water-dispersible resins or compounds.

To impart smoothness to the easy-to-adhere layer, it is preferable to add particles. The fine particles preferably have a mean particle size of 2 µm or less. Particles having a mean particle size of more than 2 µm are more likely to come off from the easy-to-adhere layer. Examples of particles to be contained in the easy-to-adhere layer include inorganic particles, such as titanium oxide, barium sulfate, calcium carbonate, calcium sulfate, silica, alumina, talc, kaolin, clay, calcium phosphate, mica, hectorite, zirconia, tungsten oxide, lithium fluoride, and calcium fluoride; and organic polymer particles, such as styrene-based particles, acrylic particles, melamine-based particles, benzoguanamine-based particles, and silicone-based particles. These may be singly added to the easy-to-adhere layer, or added in a combination of two or more types.

The method for applying the coating solution for use may be a known method as in the coating layer described above. Examples of methods for applying the coating solution include reverse roll coating, gravure coating, kiss coating, roll brush coating, spray coating, air-knife coating, wire-bar coating, and pipe doctor coating. These methods can be used singly or in combination.

Hard Coating Layer

When the polyester film according to the present invention is used as a surface protection film for a foldable display by positioning the polyester film on the surface of the display, the polyester film preferably has a hard coating layer on at least one surface of the film. The hard coating layer is preferably used in a display by positioning on the surface of the polyester film that is the front surface of the display. The resin for forming a hard coating layer can be any resin, without particular limitation, such as acrylic resins, siloxane resins, inorganic hybrid resins, urethane acrylate resins, polyester acrylate resins, and epoxy resins. These resins may also be used in a combination of two or more. The resin for use may contain particles such as inorganic filler or organic filler.

Film Thickness of Hard Coating Layer

The film thickness of the hard coating layer is preferably 1 to 50 µm. A film thickness of 1 µm or more is preferable because it ensures sufficient curing and leads to a high level of pencil hardness. A film thickness of 50 µm or less suppresses curling caused by hardening and contraction of the hard coating, thus increasing film handleability.

Coating Method

The method for forming a hard coating layer for use may be, for example, a Mayer bar, gravure coater, die coater, or knife coater method. These methods can be used without any particular limitation and can be suitably selected according to the viscosity and film thickness.

Curing Conditions

The method for curing the hard coating layer for use may be a method using energy beams such as UV light or electron beams, or a method using heat. From the standpoint of minimizing damage to the film, a method using energy beams such as UV light or electron beams is preferable.

Pencil Hardness

The pencil hardness of the hard coating layer is preferably 3H or higher, and more preferably 4H or higher. A pencil hardness of 3H or higher prevents the hard coating layer from being easily scratched, while not decreasing visibility. Although a higher level of pencil hardness of the hard coating layer is generally better, the pencil hardness may be 9H or lower, or 8H or lower; even a hard coating layer with a pencil hardness of 6H or lower is usable in practice without problems.

Properties of Hard Coating Layer

The hard coating layer in the present invention can be used for the purpose of protecting a display by increasing the pencil hardness of the surface as described above, and preferably has high transmittance. The hard coating film has a total light transmittance of preferably 87% or more, and more preferably 88% or more. A transmittance of 87% or more ensures sufficient visibility. In general, a higher total light transmittance of the hard coating film is preferable. However, from the standpoint of stable production, the total light transmittance of the hard coating film is preferably 99% or less, and may be 97% or less. In general, the hard coating film preferably has a lower haze, and preferably a haze of 3% or less. The hard coating film has a haze of more preferably 2% or less, and most preferably 1% or less. A haze of 3% or less can improve the visibility of images. Although a lower haze is generally better, the haze of the hard coating film is preferably 0.1% or more, or may be 0.3% or more, from the standpoint of stable production.

The hard coating layer may have further functions added. For example, a hard coating layer with additional functionality, such as an anti-glare layer, anti-glare anti-reflective layer, anti-reflective layer, low-reflection layer, or antistatic layer having the predetermined pencil hardness above, can also be preferably used in the present invention.

The polyester film used as a substrate film of a touch-screen module may also be provided with a hard coating layer. For example, when an ITO layer is used as a transparent electrode layer of a touchscreen module, a refractive index adjustment layer is preferably provided between the substrate film and the transparent electrode layer to make the electrode pattern less visible. In this case, the hard coating layer itself may serve as a refractive index adjustment layer, or a separate refractive index adjustment layer may be laminated.

In another embodiment, the polyester film for a foldable display according to the present invention can be used in a foldable display in which the polyester film is disposed as a back protection film. For example, the polyester film for a foldable display according to the present invention can be used as a single continuous film placed through the folding portion of the foldable display.

In another embodiment, a portable terminal device comprising the polyester foldable display according to the present invention is provided.

EXAMPLES

The following describes the present invention with reference to Examples and Comparative Examples. First, the methods for evaluating characteristic values carried out in the present invention are described below.

(1) Intrinsic Viscosity

A film or polyester resin was crushed, dried, and then dissolved in a mixed solvent of phenol and tetrachloroethane in a ratio of phenol to tetrachloroethane of 60/40 (mass ratio). This solution was then centrifuged to remove inorganic particles. The flow time of the solution with a concentration of 0.4 (g/dl) and the flow time of the solvent alone were measured with an Ubbelohde viscometer at 30° C. From the time ratio, the intrinsic viscosity was calculated by using the Huggins equation with the assumption of Huggins's constant being 0.38. Using the same calculation formula, polyethylene terephthalate (PET) and polyethylene naphthalate (PEN) were evaluated.

(2) Refractive Index

Using a laser refractometer produced by Metricon Co., Ltd. (Model 2010 Prism Coupler) and clamping a sheet of a sample film at a pressure of the 40th scale of a built-in pressure gauge, the refractive index of the sample film was measured using a laser beam at a wavelength of 633 nm to obtain a spectrum chart. The point where the detector output sharply dropped was read on the obtained spectrum chart, and this value was defined as the refractive index. The refractive indices in the longitudinal direction and the width direction were measured in TE mode, whereas the refractive index in the thickness direction was measured in TM mode.

(3) Total Light Transmittance and Haze

Total light transmittance and haze were measured with a haze meter (NDH5000, produced by Nippon Denshoku Industries Co., Ltd.).

(4) Density

Density was measured in accordance with the method described in JIS K 7112:1999 (density-gradient tube method) (unit: $g/cm^3$).

(5) Maximum Heat Shrinkage

A sample film was cut to a size of 10 mm (length)×250 mm (width), and a long side was aligned with the direction to be measured and marked at intervals of 200 mm. Distance A, which is a distance between the marks, was measured under a constant tension of 5 g. Subsequently, the sample film was allowed to stand in atmosphere at 150° C. in an oven for 30 minutes without a load, and then removed from the oven, followed by cooling to room temperature. Thereafter, distance B, which is a distance between the marks, was measured under constant tension of 5 g, and the heat shrinkage (%) was calculated by the following formula. The heat shrinkage was measured at three evenly separated points in the width direction of the sample film, and the average of the values at the three points was taken as the heat shrinkage (%).

Heat Shrinkage (%)=[(A−B)×100]/A

The sample film was cut so that the vertical and horizontal directions were different for both the bending direction and the folding direction, and measurement was performed. The data of the direction larger in measurement value was taken as the maximum heat shrinkage (%).

(6) High-Temperature Hold Angle

The depth of a crease formed after fixing the polyester film in such a manner that a strain of 1.7% is applied to both surfaces of a sample film at a bent portion was evaluated.

Figure 3:
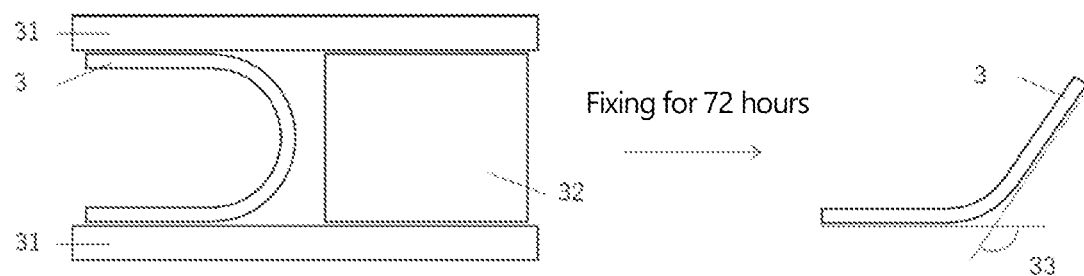
FIG. 3 is a schematic diagram to illustrate a method for measuring the hold angle in the bending direction.

FIG. 3 is a schematic diagram to show a method for measuring the hold angle in the bending direction. A sample film (reference numeral 3) was cut to a size of 10 mm in the width direction and 50 mm in the flow direction. Two PTFE plates (reference numeral 31) were stacked one on the other. When a 50-μm sample film was used, a PTFE plate with a thickness of 3 mm (reference numeral: 32) was inserted as a spacer between the two PTFE plates to form a space between them. Double-sided tape was applied to both ends of the sample film. The sample film in a bent state was inserted into the space of 3 mm between the PTFE plates, and both ends of the sample were fixed to the PTFE plates with the double-sided tape. After the sample film in this state was placed in a 85° C./dry environment for 18 hours, the sample film was removed from the space between the two PTL plates (reference numeral 31). Five minutes after the removal, the angle of the crease formed on the film (reference numeral 33) was measured. This angle is defined as a high-temperature hold angle.

To keep the strain constant, the thickness 32 of the PTFE plate used as a spacer is changed depending on the thickness of the film.

Figure 4:
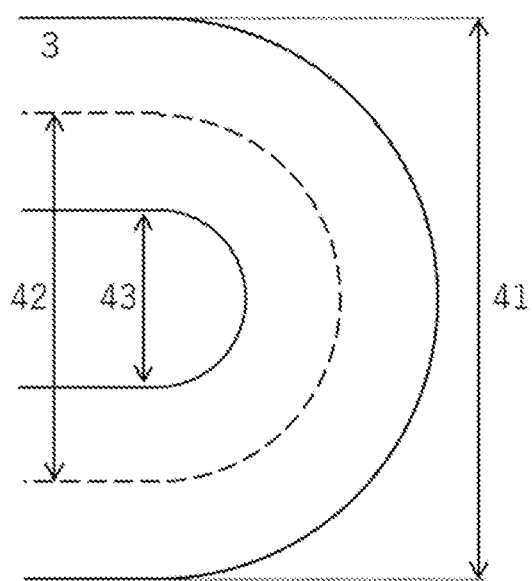
FIG. 4 is an enlarged schematic diagram of a sample film (reference numeral 4) in a state in which it is interposed between two PTFE plates.

FIG. 4 is an enlarged schematic diagram of a sample film (reference numeral 3) interposed between two PTFE plates (reference numeral 31 of FIG. 3). A neutral plane to which neither compressive stress nor tensile stress is applied is defined as the center in the thickness direction (the dashed line in the figure), and the difference between the neutral plane and both surfaces is defined as strain. More specifically, the strain applied to both surfaces can be expressed by the following formula.

In FIG. 4, reference numeral 41 indicates the diameter of the outermost surface of the sample film; reference numeral 42 indicates the diameter of the neutral surface of the sample film; and reference numeral 43 indicates the diameter of the innermost surface of the sample film.

In the evaluation of the high-temperature hold angle, strain (1.7%) can be expressed by the following method.

Strain (1.7%)=(|Semi-Circumference of the Outermost Surface or the innermost surface−Semi-circumference of the neutral plane|/Semi-circumference of the neutral plane)×100

When the thickness of a sample film is defined as t (mm) and the bend diameter (diameter of the outermost surface), i.e., the thickness of the spacer used, is defined as d (mm), the semi-circumferences can be calculated according to the following formulas.

Semi-circumference of the outermost surface=$d \times n/2$

Semi-circumference of the neutral face=$(d−t) \times n/2$

Semi-circumference of the innermost surface=$(d−2t) \times n/2$

From the above, when the strain is set to 1.7%, the thickness of the sample film is defined as t (mm), and the bend diameter, i.e., the thickness of the spacer used, is defined as d (mm), the thickness of the spacer (PTFE plate) is determined according to the following formula. The spacer thickness relative to typical film thickness can be shown, for example, as below.

Spacer thickness $d$ (mm)=film thickness (mm)×60

For example, when the sample film has a thickness of 50 μm, the diameter of the outermost surface (reference numeral 41) is the same as the thickness d of the spacer, which is 3 mm. The diameter of the innermost surface (reference numeral 43) is 2.9 mm, and the diameter of the neutral plane (reference numeral 42) is 2.95 mm. Here, in the above formula that shows strain, the semicircle circumference of the outermost surface and the semicircle circumference of the innermost surface can be appropriately selected.

Preparation of Polyethylene Naphthalate Pellet

Using 100 parts of dimethyl naphthalene-2,6-dicarboxylate and 60 parts of ethylene glycol and using 0.03 parts of manganese acetate tetrahydrate as an ester exchange catalyst, a transesterification reaction was performed for 120 minutes while gradually raising the temperature from 150° C. to 238° C. During the course of the reaction, when the reaction temperature reached 170° C., trimethyl phosphate (in the form of a solution heated in ethylene glycol at 135° C. under a pressure of 0.11 to 0.16 MPa for 5 hours: 0.023 parts in terms of trimethyl phosphate) was added. After completion of the transesterification reaction, 0.024 parts of antimony trioxide was added. The reaction product was then transferred to a polymerization reactor. The temperature was raised to 290° C. and a polycondensation reaction was performed under a high vacuum of 27 Pa or less. Polyethylene-2,6-naphthalene dicarboxylate having an intrinsic viscosity of 0.48 dl/g and containing substantially no particles was obtained.

Preparation of Polyethylene Terephthalate Pellet

A continuous esterification reactor including a three-stage complete mixing tank equipped with a stirrer, a partial condenser, a feedstock inlet, and a product outlet was used as an esterification reactor. A slurry of TPA (2 tons/hr), EG (2 mol per mol of TPA), and antimony trioxide (160 ppm of Sb atoms based on produced PET) was continuously supplied to the first esterification reaction vessel of the esterification reactor, and was allowed to react at 255° C. at normal pressure for an average residence time of 4 hours.

Subsequently, the reaction product in the first esterification reaction vessel was continuously taken out of the system and supplied to the second esterification reaction vessel. EG distilled from the first esterification reaction vessel in an amount of 8 mass % of the produced polymer (produced PET) was then supplied to the second esterification reaction vessel, and an EG solution containing magnesium acetate in an amount of 65 ppm on a Mg atom basis relative to the produced PET, and an EG solution containing TMPA in an amount of 20 ppm on a P atom basis relative to the produced PET, were further added thereto, followed by a reaction at 260° C. under ordinary pressure with an average residence time of 1.5 hours. Subsequently, the reaction product in the second esterification reaction vessel was continuously taken out of the system and supplied to the third esterification reaction vessel, and an EG solution containing TMPA in an amount of 20 ppm on a P atom basis relative to the produced PET was further added thereto, followed by a reaction at 260° C. under ordinary pressure with an average residence time of 0.5 hours. The esterified reaction product generated in the third esterification reaction vessel was continuously supplied to a three-stage continuous polycondensation reactor to perform polycondensation, and filtered through a sintered stainless-steel filter material (nominal filtration accuracy: 5-μm particles are 90% cut), thereby obtaining polyethylene terephthalate pellet (a) with an intrinsic viscosity of 0.58 dl/g.

Polymerization of Urethane Resin 72.96 parts by mass of 1,3-bis(methylisocyanate) cyclohexane, 12.60 parts by mass of dimethylol propionic acid, 11.74 parts by mass of neopentyl glycol, 112.70 parts by mass of polycarbonate diol with a number average molecular weight of 2000, and, as solvents, 85.00 parts by mass of acetonitrile and 5.00 parts by mass of N-methylpyrrolidone, were placed in a four-necked flask equipped with a stirrer, a Dimroth condenser, a nitrogen-feeding tube, a silica-gel-drying tube, and a thermometer, and stirred in a nitrogen atmosphere at 75° C. for 3 hours; the reaction mixture was confirmed to have reached a predetermined amine equivalent. Subsequently, after this reaction mixture was cooled to 40° C., 9.03 parts by mass of triethyl amine was added, thereby obtaining a polyurethane prepolymer D solution. Subsequently, 450 g of water was added to a reactor equipped with a homogenizing disperser capable of high-speed stirring, and the temperature was adjusted to 25° C., followed by dispersing an isocyanate-terminated prepolymer in water with stirring at 2000 min$^{-1}$. Thereafter, some acetonitrile and water were removed under reduced pressure, thereby preparing a water-soluble polyurethane resin (A) with a solids content of 35 mass %.

Polymerization of Water-Soluble Carbodiimide Compound 200 parts by mass of isophorone diisocyanate and 4 parts by mass of 3-methyl-1-phenyl-2-phosphorene-1-oxide as a carbodiimidized catalyst were added to a flask equipped with a thermometer, a nitrogen-gas-feeding tube, a reflux condenser, a dropping funnel, and a stirrer, and stirred in a nitrogen atmosphere at 180° C. for 10 hours, thereby obtaining an isocyanate-terminated isophorone carbodiimide (degree of polymerization: 5). Subsequently, 111.2 g of the obtained carbodiimide and 80 g of polyethylene glycol monomethyl ether (molecular weight: 400) were reacted at 100° C. for 24 hours. Water was gradually added thereto at 50° C., thereby obtaining a transparent yellowish water-soluble carbodiimide compound (B) with a solids content of 40 mass %.

Preparation of Coating Solution for Forming Easy-to-Adhere-Layer

The following coating materials were mixed, thereby preparing a coating solution.

Water: 16.97 parts by mass
Isopropanol: 21.96 parts by mass
Polyurethane resin (A): 3.27 parts by mass
Water-soluble carbodiimide compound (B): 1.22 parts by mass
Particles: 0.51 parts by mass
(silica sol with a mean particle size of 40 nm, solids concentration: 40 mass %)
Surfactant: 0.05 parts by mass
(silicone-based surfactant, solids concentration: 100 mass %)

Example 1

Polyethylene naphthalate pellets were supplied to an extruder and melted at 310° C. This polymer was filtered through a sintered stainless-steel filter material (nominal filtration accuracy: 10-μm particles are 95% cut) and extruded from the outlet into a sheet form. The sheet-form polymer was then brought into contact with a casting drum (surface temperature: 60° C.) by using an electrostatic application casting method to solidify the polymer by cooling, thereby preparing an unstretched film. The coating solution for forming an easy-to-adhere layer was applied to both surfaces of the obtained uniaxially stretched film by roll coating, and then dried at 80° C. for 20 seconds. Adjustment was made so that the amount of the applied coating solution for forming an easy-to-adhere layer was 0.06 g/m$^2$ after final drying (after being biaxially drawn). Thereafter, the film was guided to a tenter, preheated at 140° C., and laterally stretched 4.2-fold at 135° C. With the width fixed, the film was subjected to heat fixation at 240° C. for 5 seconds, and further relaxed by 1% in the width direction at 180° C., thereby obtaining a polyethylene naphthalate film with a thickness of 50 μm. Table 1 shows the evaluation results.

Examples 2 to 6

After unstretched films were obtained in the same manner as in Example 1, the unstretched film was uniformly heated to 120° C. with heating rolls and heated to 135° C. with a non-contact heater, and subjected to roll-drawing (stretching in the longitudinal direction) at the MD draw ratios shown in Table 1. Polyester films were obtained in the same manner as in Example 1, except that the draw ratio in the longitudinal direction was changed as shown in Table 1.

Example 7

After an unstretched film was obtained in the same manner as in Example 1, the unstretched film was uniformly heated to 120° C. with heating rolls and heated to 140° C. with a non-contact heater, and subjected to roll-drawing (stretching in the longitudinal direction) at the MD draw ratio shown in Table 1. A polyester film was prepared in the same manner as in Example 1, except that the draw ratio in the longitudinal direction was changed as shown in Table 1.

Comparative Example 1

Polyethylene terephthalate pellets were supplied to an extruder and melted at 285° C. This polymer was filtered through a sintered stainless-steel filter material (nominal filtration accuracy: 10-μm particles are 95% cut) and extruded from the outlet into a sheet form. The sheet-form polymer was then brought into contact with a casting drum (surface temperature: 30° C.) by using an electrostatic application casting method to solidify the polymer by cooling, thereby preparing an unstretched film. The unstretched film was uniformly heated to 75° C. with heating rolls and heated to 85° C. with a non-contact heater, and subjected to roll-drawing (stretching in the longitudinal direction) at a draw ratio of 1.4-fold.

The coating solution for forming an easy-to-adhere layer was applied to both surfaces of the obtained uniaxially stretched film by roll coating, and then dried at 80° C. for 20 seconds. Adjustment was made so that the amount of the applied coating solution for forming an easy-to-adhere layer was 0.06 g/m² after final drying (after being biaxially drawn). Thereafter, the film was guided to a tenter, preheated at 105° C., and laterally stretched 4.0-fold at 95° C. With the width fixed, the film was subjected to heat fixation at 230° C. for 5 seconds, and further relaxed by 4% in the width direction at 180° C., thereby obtaining a polyethylene terephthalate film with a thickness of 50 μm.

Comparative Example 2

A polyester film was obtained in the same manner as in Comparative Example 1 except that the draw ratio in the longitudinal direction was changed to 1.4-fold as shown in Table 1.

The polyester films obtained in the Examples and Comparative Examples were individually laminated on the non-visible side of organic EL modules via a 25-μm-thick adhesive layer, thereby preparing foldable smartphone-type displays that can be folded in half at their center, with a radius of 3 mm, which corresponds to the bend radius in FIG. 1. More specifically, each polyester film was disposed on the non-visible side of a single continuous display via the folding portion so that the polyester film was bonded to a polyimide film comprising a barrier layer, which is an organic EL substrate. The displays prepared using the polyester films obtained in the Examples were satisfactory in terms of operation and visibility as portable smartphones that are foldable in half at their center. Even when the temperature rose to a high temperature, there were no problems in terms of operation or visibility.

On the other hand, the foldable displays prepared by using the polyester films obtained in the Comparative Examples in the same manner were not so desirable because image distortion appeared to have occurred at the folding portion of the displays as the frequency of use at high temperatures was increased. Further, some of the polyester films had dents and scratches on the surface.

TABLE 1

| | Starting material ratio | | Intrinsic viscosity | Draw ratio | | Draw temperature in the longitudinal direction | Preheating temperature in the width direction | Heat fixation temperature | Thickness | Density |
|---|---|---|---|---|---|---|---|---|---|---|
| | PET | PEN | (dl/g) | Longitudinal direction | Width direction | (° C.) | (° C.) | (° C.) | (μm) | (g/cm³) |
| Example 1 | 0 | 100 | 0.45 | 1.0 | 4.2 | — | 140 | 240 | 50 | 1.351 |
| Example 2 | 0 | 100 | 0.45 | 1.4 | 4.2 | 135 | 140 | 240 | 50 | 1.351 |
| Example 3 | 0 | 100 | 0.45 | 1.7 | 4.2 | 135 | 140 | 240 | 50 | 1.351 |
| Example 4 | 0 | 100 | 0.45 | 1.9 | 4.2 | 135 | 140 | 240 | 50 | 1.352 |
| Example 5 | 0 | 100 | 0.45 | 2.3 | 4.2 | 135 | 140 | 240 | 50 | 1.352 |
| Example 6 | 0 | 100 | 0.45 | 2.8 | 4.2 | 135 | 130 | 240 | 50 | 1.354 |
| Example 7 | 0 | 100 | 0.45 | 3.3 | 3.2 | 140 | 130 | 240 | 50 | 1.356 |
| Comp. Ex. 1 | 100 | 0 | 0.60 | 3.4 | 4.0 | 85 | 105 | 230 | 50 | 1.396 |
| Comp. Ex. 2 | 100 | 0 | 0.60 | 1.4 | 4.0 | 85 | 105 | 230 | 50 | 1.385 |

| | Refractive index | | | Bending direction | 85° C. hold angle (°) | Total light transmittance (%) | Haze (%) | Maximum heat shrinkage (%) |
|---|---|---|---|---|---|---|---|---|
| | Longitudinal direction | Width direction | Thickness direction | | | | | |
| Example 1 | 1.644 | 1.854 | 1.496 | Longitudinal direction | 79 | 90 | 1.05 | 0.21 |
| Example 2 | 1.659 | 1.833 | 1.494 | Longitudinal direction | 79 | 90 | 1.05 | 0.21 |
| Example 3 | 1.666 | 1.830 | 1.493 | Longitudinal direction | 76 | 91 | 1.05 | 0.27 |
| Example 4 | 1.673 | 1.824 | 1.491 | Longitudinal direction | 78 | 91 | 1.07 | 0.23 |
| Example 5 | 1.672 | 1.808 | 1.498 | Longitudinal direction | 78 | 91 | 1.07 | 0.38 |
| Example 6 | 1.705 | 1.790 | 1.486 | Longitudinal direction | 77 | 91 | 1.07 | 0.24 |
| Example 7 | 1.730 | 1.770 | 1.508 | Longitudinal direction | 77 | 92 | 0.8 | 0.39 |
| Comp. Ex. 1 | 1.650 | 1.669 | 1.496 | Longitudinal direction | 34 | 91 | 0.8 | 1.0 |
| Comp. Ex. 2 | 1.596 | 1.684 | 1.516 | Longitudinal direction | 31 | 91 | 0.8 | 1.4 |

INDUSTRIAL APPLICABILITY

While maintaining its suitability in mass production, a foldable display produced using the polyester film for a foldable display according to the present invention is unlikely to deform after the polyester film positioned on the back surface of the foldable display is repeatedly folded, thus not causing image distortion at the folding portion of the display. In particular, a mobile device or image display device equipped with a foldable display using the polyester film according to the present invention as a back protection film provides beautiful images and has a variety of functionality, while being highly convenient such as in terms of portability and also having high reliability.

DESCRIPTION OF THE REFERENCE NUMERALS

- 1: foldable display
- 11: bend radius
- 2: polyester film for surface protection films of foldable displays
- 21: folding portion
- 22: bending direction (the direction orthogonal to the folding portion)
- 3: sample film
- 31: PTFE plate
- 32: spacer
- 33: hold angle
- 41: diameter of the outermost surface
- 42: diameter of the neutral plane
- 43: diameter of the innermost surface

The invention claimed is:

1. A polyester film for a foldable display, wherein the polyester film is a single-layer film comprising 95 weight % or more of a polyethylene-2,6-naphthalene dicarboxylate homopolymer satisfying the following conditions:
   (1) having a refractive index in a bending direction of 1.644 to 1.730, and
   (2) having a refractive index in a folding direction of 1.770 to 1.854, and
   (3) having a thickness of 10 μm or more and 125 μm or less and a high-temperature hold angle in a bending direction of 70° or more, wherein the high-temperature hold angle refers to an angle of a crease formed after fixing the polyester film at a heating temperature of 85° C. for 18 hours in such a manner that a strain of 1.7% is applied to both surfaces of the polyester film at a bent portion, and the bending direction refers to a direction that is orthogonal to a folding portion.

2. The polyester film for a foldable display according to claim 1, having a density of 1.349 g/cm$^3$ or more.

3. The polyester film for a foldable display according to claim 2, comprising an easy-to-adhere layer on at least one surface of the polyester film.

4. A foldable display comprising the polyester film for a foldable display of claim 3, the polyester film being disposed as a back protection film, wherein the polyester film is a single continuous polyester film placed through the folding portion of the foldable display.

5. A mobile device comprising the foldable display of claim 4.

6. A foldable display comprising the polyester film for a foldable display of claim 2, the polyester film being disposed as a back protection film, wherein the polyester film is a single continuous polyester film placed through the folding portion of the foldable display.

7. A mobile device comprising the foldable display of claim 6.

8. The polyester film for a foldable display according to claim 1, comprising an easy-to-adhere layer on at least one surface of the polyester film.

9. A foldable display comprising the polyester film for a foldable display of claim 8, the polyester film being disposed as a back protection film, wherein the polyester film is a single continuous polyester film placed through the folding portion of the foldable display.

10. A mobile device comprising the foldable display of claim 9.

11. A foldable display comprising the polyester film for a foldable display of claim 1, the polyester film being disposed as a back protection film, wherein the polyester film is a single continuous polyester film placed through the folding portion of the foldable display.

12. A mobile device comprising the foldable display of claim 11.

* * * * *